United States Patent [19]
Wada et al.

[11] Patent Number: 5,129,439
[45] Date of Patent: Jul. 14, 1992

[54] TIRE AND RIM ASSEMBLY AND TIRE FOR USE THEREIN

[75] Inventors: Yasuo Wada; Hiroshi Itoh, both of Nishinomiya, Japan

[73] Assignee: Sumitomo Rubber Industries, Hyogo, Japan

[21] Appl. No.: 578,607

[22] Filed: Sep. 7, 1990

Related U.S. Application Data

[62] Division of Ser. No. 401,164, Aug. 31, 1989, Pat. No. 5,070,921.

[30] Foreign Application Priority Data

Sep. 6, 1988 [JP] Japan ................. 63-223942

[51] Int. Cl.$^5$ ................. B60C 17/00; B60C 15/024
[52] U.S. Cl. ................. 152/516; 152/544
[58] Field of Search ................. 52/454, 516, 539, 544

[56] References Cited

U.S. PATENT DOCUMENTS

| | | | |
|---|---|---|---|
| 2,731,064 | 1/1956 | Powers | 152/544 |
| 4,794,968 | 1/1989 | Griffiths et al. | |
| 4,878,527 | 11/1989 | Noma | |
| 4,940,069 | 7/1990 | Nakaski et al. | 152/544 |

FOREIGN PATENT DOCUMENTS

| | | |
|---|---|---|
| 0273056 | 7/1988 | European Pat. Off. |
| 1005862 | 4/1957 | Fed. Rep. of Germany |
| 49-13802 | 2/1974 | Japan |
| 57-15007 | 3/1982 | Japan |
| 62-06889 | 11/1987 | Japan |
| 1584554 | 2/1981 | United Kingdom |

Primary Examiner—Michael W. Ball
Assistant Examiner—Nancy T. Krawczyk
Attorney, Agent, or Firm—Birch, Stewart, Kolasch & Birch

[57] ABSTRACT

A tire and an assembly of a rim and a tire are disclosed. The rim has a pair of rim bases, a hump formed axially inside each rim base, and an annular groove formed axially inside each hump.

The tire comprises a pair of beads having a bead base seated on the rim base, a pair of bead cores disposed one in each bead, at least one of the beads having a toe and a hump groove disposed between the toe and the bead base, wherein, the tip of the toe is located radially outside a bead base line, and under such condition; that the tire is inflated to a normal internal pressure, the hump groove and the tip of the toe are spaced apart from the hump and the annular groove, and the distance L in the radial direction between the radially outermost point RT of the hump and the radially outermost point PT of the hump groove is not less than 0.5 mm and not more than 2.0 mm.

6 Claims, 4 Drawing Sheets

TIRE AND RIM ASSEMBLY AND TIRE FOR USE THEREIN

This application is a divisional of copending application Ser. No. 07/401,164 filed on Aug. 31, 1989, now U.S. Pat. No. 5,070,921.

BACKGROUND OF THE INVENTION

The present invention relates to a tire and rim assembly capable of running safely without allowing tire beads to be dislocated from the wheel rim under such conditions where the internal pressure of the tire is lowered or that the vehicle makes a sharp turn at high speed. The present invention is also directed to, and a tire capable of being used in the assembly and also capable of being mounted on a standard rim.

In conventional tire and rim assemblies, the beads of the tire are retained on the rim bases of the rim by means of the friction force therebetween due to the internal pressure of the tire.

Accordingly, when the internal pressure of the tire is lowered, the retaining force is also reduced, and if a cornering operation is made in a state where the internal pressure is greatly lowered by puncture, then the beads are removed from the wheel rim by the accompanying lateral force. Especially when the rim is provided with a well for tire mounting work, the beads fall into the well, and as a result, the tire is completely separated from the rim, and a serious accident is induced.

The lateral force caused by cornering shifts the tread in the lateral direction, and this shift is transferred to the beads through the sidewalls, and the bead is subjected to a force F in the axial direction and also a moment M around a bead core, for example as shown in FIG. 5, which is, however, a figure showing the operation of the tire and rim assembly according to the present invention. Under such condition, if the internal pressure of the tire is low, the moment lifts up the heel of the bead to reduce the friction force with the rim, and the bead is moved axially inwardly on the tapered rim base RB, which lowers the tension of the bead core, and as a result, the retaining force of the bead is suddenly decreased, and finally the bead falls into the well WE.

To solve the above-mentioned problems, there have been proposed:

the use of a rim without a well;

the use of a rim provided at the axially inner edge of the rim base with a hump on which the toe of the bead impinges;

the combination use of a rim provided with a hump in the range of the rim base and a tire provided with an annular groove to engage with the hump (Japanese Patent Application KOKAI No. 49-13802); and the combination use of a rim provided at the axially inner edge of the rim base with an annular groove and a tire provided at the bead toe with a protuberance to be inserted within the annular groove (Japanese Patent Publication TOKKYO KOHO No. 57-15007). However, the rim disclosed in the Japanese Patent Publication TOKKYO KOHO No. 57-15007, is formed in a special shape so that it becomes impossible to use with conventional standard tires.

Further, in International Publication No. WO87/06889, there has been proposed a tire and rim assembly and a rim capable of keeping the bead safe at low internal pressure in which conventional standard tires can be used in addition to special tires designed therefor.

This assembly has superior effects as a bead retaining mechanism and the rim can be safely used with a standard tire having a conventional bead construction.

In such a special tire, however, there is the possibility that the beads are damaged if mounted on or demounted from the rim, and a little more labor is required for the mounting and demounting operation in comparison with the conventional tire and rim assembly.

Moreover, if the special tire is mounted on a conventional standard rim, insufficient matching, that is, bead unseating may be caused due to the bead toe having a large volume.

SUMMARY OF THE INVENTION

It is therefore an object of the present invention to provide a tire and rim assembly, in which beads are prevented from being dislocated from the rim by the lateral force generated not only at a sudden decrease in the internal pressure such as a puncture but also by a cornering operation, and in which the mounting and demounting operation is more easily achieved. Also it is another object of the present invention to provide a tire itself capable of being used in an assembly as well as being mounted on a conventional standard rim.

In the tire and rim assembly, when the tire is inflated to a normal internal pressure, the hump groove of the tire bead does not contact with the wheel rim. However, if the internal pressure of the tire is lowered by puncture and further a lateral force is applied on the tire by a cornering operation, then the resultant moment rotates the bead around the bead core, and as a result the hump groove and the bead toe of the tire engage with the hump and the annular groove of the wheel rim respectively, while lifting the bead heel.

Accordingly, a force resisting the bead unseating force is generated to prevent the bead from falling into the well, thereby preventing the tire from being dislocated from the rim. Here, when the distance L is not more than 0.5 mm, the mounting and demounting operation is difficult. When it is more than 2.0 mm, the retaining force of the bead is insufficient.

Further, when the tire of the present invention in which the tip of the bead toe is located radially outside the bead base line, is used in the assembly, it does not disturb the mounting and demounting operation, and it becomes possible to make the mounting and demounting operation easy in the same way as conventional tire and rim assemblies. Also, it becomes possible to mount the tire on the conventional standard rim.

BRIEF DESCRIPTION OF THE DRAWINGS

Embodiments of the present invention will be described in detail by way of example only with reference to the accompanying drawings, in which.

DETAILED DESCRIPTION OF THE INVENTION

Figure 1:
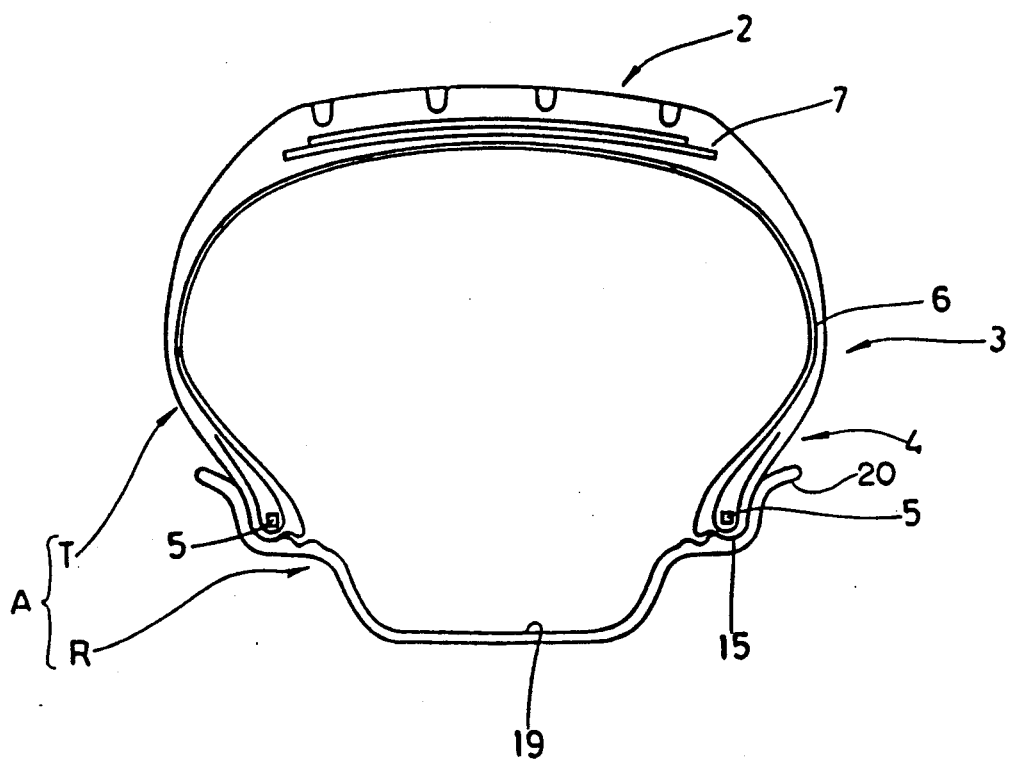
FIG. 1 is a sectional view of a tire and rim assembly according to the present invention.
Figure 2:
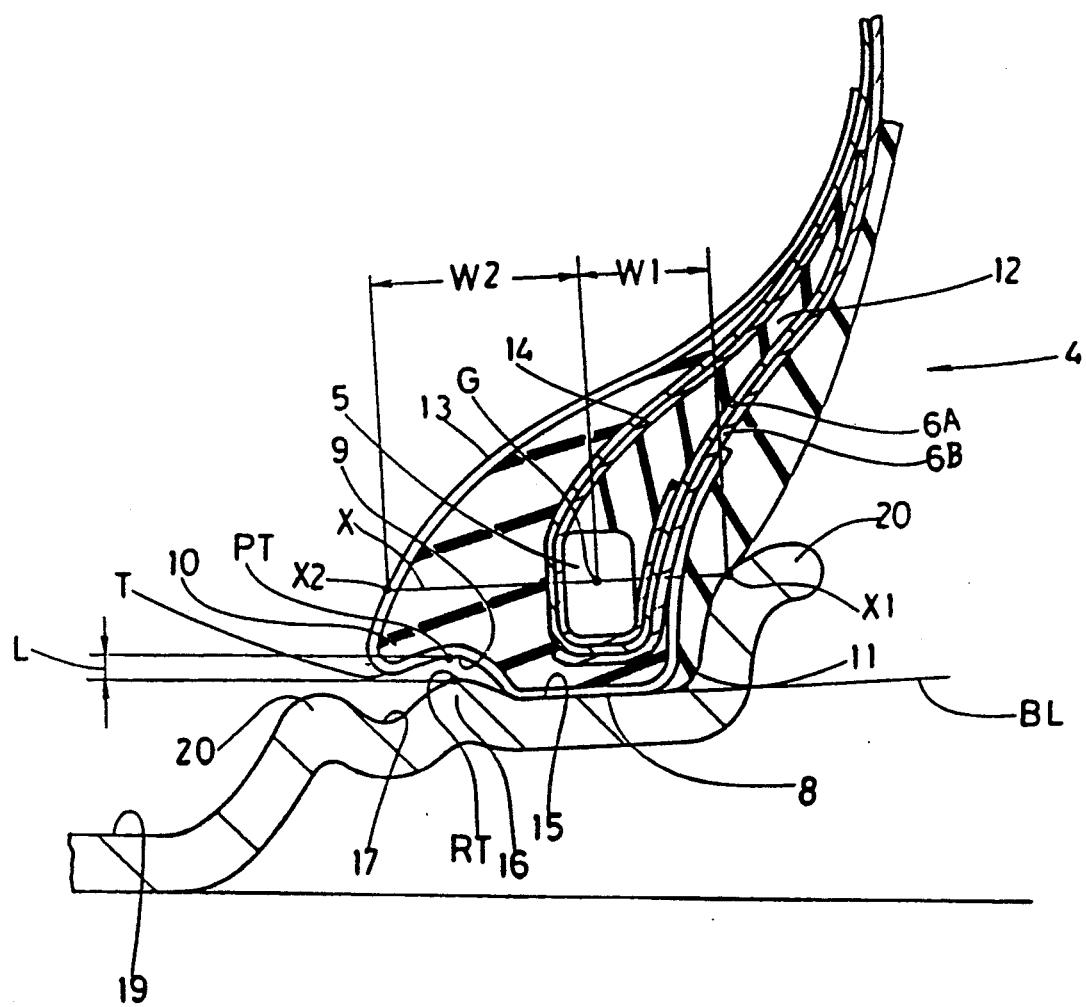
FIG. 2 is a sectional view of the bead of the tire in FIG. 1.

In FIG. 1 and FIG. 2, the tire T has a pair of beads 4, a tread 2, and a pair of sidewalls 3, and the tire comprises a bead core 5 and a bead apex 12 disposed in each bead, a carcass 6 extending between the beads through the sidewalls and tread, and a belt 7 disposed radially outside the carcass.

The carcass 6 is composed of two inner and outer plies 6A and 6B of radially arranged cords, wherein the inner carcass ply 6A is turned up around bead cores 5 from the inside to the outside thereof to be secured thereto, and the outer carcass ply 6B is extended along the outside of the turned up portion of the inner carcass ply and turned around the bead core from the outside toward the axially inside thereof so that the edge is terminated inside the bead core 4 in the bead base region.

For the carcass cords, organic fiber cords such as aliphatic polyamid, rayon, polyester, aromatic polyamide and the like, carbon fiber cords, glass fiber cords, and metallic fiber cords may be used.

The belt 7 is made of at least two plies of high modulus cords such as aromatic polyamide fiber cords, carbon fiber cords, glass fiber cords, metallic fiber cords and the like, which are arranged at relatively small angles, for example 10 to 30 degrees, with respect to the circumferential direction so that the belt plies cross each other.

The bead apex 12 is made of a relatively hard rubber disposed radially outward of the bead core 5 between the inner carcass ply turned up portion and the main portion. The bead apex is tapered radially outwardly from the bead core, thereby having a substantially triangular sectional shape.

In each bead region, a reinforcing layer 14 made of organic fibers or metallic fibers is disposed between the carcass and the bead core and apex and folded around the bead core to wrap the bead core and apex therein.

Each of the beads 4 has a bead base 8 positioned radially inside the bead core 5 as shown in FIG. 2.

The axially outer edge of the bead base 8 is connected to the radially extending outer surface of the bead which contacts with a rim flange 20 through a rounded bead heel 11.

Here, the shape and dimensions of the tire from the inner edge of the bead base to a portion on the outside of the bead about the outer edge of the rim flange, are formed in the same as a conventional standard tire of corresponding size, that is, the diameter, width, taper angle, etc. are set according to the standard.

At least one bead, but in this embodiment each bead, is provided axially inward with a circumferentially continuously extending hump groove 9 which is formed immediately axially inside the bead base 8, with an obliquely and axially inwardly projecting toe 10.

The radially innermost edge T of the bead toe 10 is located radially outside a bead base line BL which is a straight line passing the bead base 11 as shown in FIG. 2.

The toe 10 is made of a relatively hard rubber, for example, one having a JIS-A hardness of 70 to 95. The toe is reinforced with a fiber reinforcing layer 13 disposed along the contour thereof to prevent deformation and damage. The axially outer portion of the layer 13 is extended up to almost the same height as the turned up portion of the carcass ply 6A, and the inner portion thereof is extended along the outline of the hump groove and the bead base, and turned radially outward at the axially inside of the bead heel 11, and then extended along the outside of the carcass.

The distance W2 of a point X2 on the inside of the bead from the center of gravity G of the bead core 5 is determined according to the distance W1 of a point X1 on the outside of the bead from the center of gravity G, and the ratio W2/W1 is not less than 1.50, wherein the points X1 and X2 are defined as intersections of a line X passing through the center of gravity G in parallel with the bead base line BL with the axially outside and the axially inside of the bead 4, respectively.

Even when the ratio W2/W1 is less than 1.50, a strong retaining force more than twice that in a conventional tire and rim assembly can be obtained, but the retaining force is substantially increased at 1.50 or higher.

The above-mentioned tire T is mounted on the rim R to form a tire and rim assembly A as shown in FIG. 1.

The rim R has a pair of rim bases 15 on which the bead bases are seated, a rim flange 20 disposed axially outward of each rim base to secure the outside of the bead, a hump 16 formed axially inside each rim base, a circumferentially continuous annular groove 17 formed axially inside each hump, a protuberance 21 formed axially inside each annular groove 17, and a well 19 for tire mounting provided between the protuberances 21.

In a state that the assembly A is inflated to a normal internal pressure, the distance L in the radial direction between the top RT of the hump 16 and the radially outermost point PT of the hump groove 9 is set in a range of not less than 0.5 mm and not more than 2.0 mm.

Figure 5:
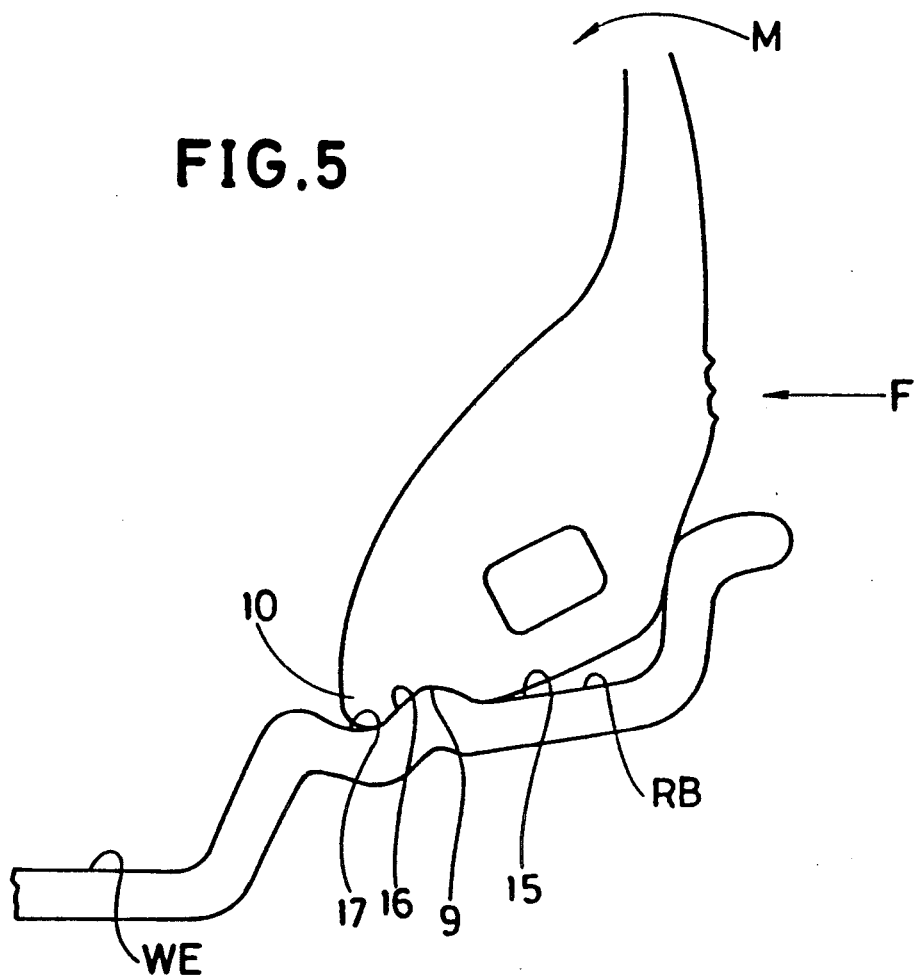
FIG. 5 is a sectional view showing an operation of the tire and rim assembly.

By designing in this way, as shown in FIG. 5, when a bending moment M is due to produced lateral force an applied while the internal pressure of the tire is lowered, the hump groove 9 and the bead toe 10 of the tire T can engage with the hump 16 and the annular groove 17 of the rim R, thereby preventing the tire from being dislocated from the rim.

Figure 3:
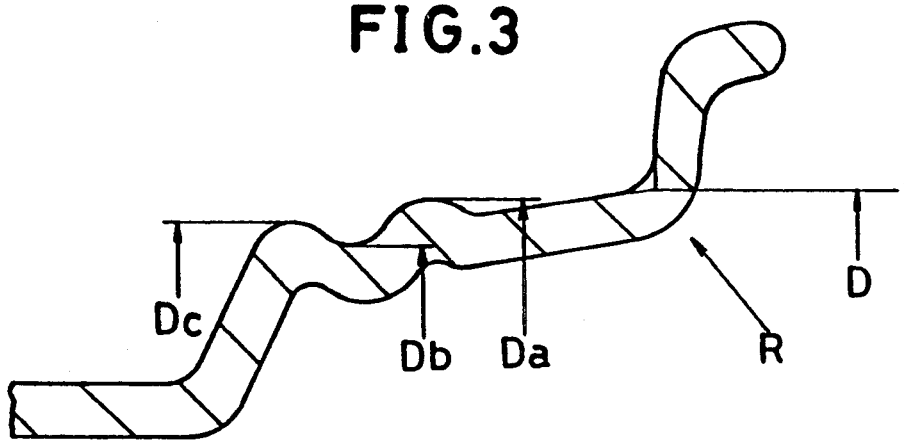
FIG. 3 is a sectional view of the rim base of the rim in FIG. 1.

When the distance L is more than 2.0 mm, the engagement becomes insufficient. On the other hand, when it is less than 0.5 mm, the mounting and dismounting operation becomes difficult. Therefore, the distance L should be set in the above range. Comparison Test Test tires of size 215/65VR15 were made according to the construction shown in FIG. 1 and FIG. 2 and the specifications given in TABLE 1. The tires were tested for the bead unseating, wherein the wheel rim of size 6.5×15 used in the tests had the shape shown in FIG. 3 and described in TABLE 1. In TABLE 1, D denotes the rim diameter, Da denotes the diameter at the apex of the hump, Db denotes the diameter at the bottom of the annular groove, Dc denotes the diameter at the apex of the inner protuberance, as shown in FIG. 3.

The bead unseating tests were made on an indoor bench tester. Each test tire was mounted on the above-mentioned rim by increasing the inner air pressure to a regular internal pressure, and then the internal pressure was decreased to zero. In such state, applying lateral force to the tread and increasing the force, the lateral force when the bead fell into the well was measured.

In the test, Examples 1–3 and Reference 1 showed higher lateral forces, that is, higher bead retaining forces of two or three times that of Reference 2.

As for the mounting and demounting operations, Examples 1 to 3 were in the same level as conventional tire and rim assemblies with no special retaining mechanism.

TABLE 1

|  | Ex. 1 | Ex. 2 | Ex. 3 |
| --- | --- | --- | --- |
| TIRE (Size 215/65VR15) | | | |
| Toe | Presence | Presence | Presence |
| Distance between Toe tip and Bead base line (mm) | 0.5 | 1.0 | 1.5 |
| Hump groove | Presence | Presence | Presence |
| Distance L (mm) | 2.0 | 1.0 | 0.5 |
| W1 (mm) | 1.1 | 1.1 | 1.1 |
| W2 (mm) | 1.8 | 1.8 | 1.8 |
| W2/W1 | 1.64 | 1.64 | 1.64 |
| RIM (Size 6.5X15) | | | |
| D (mm) | 380.2 | 380.2 | 380.2 |
| Da (mm) | 379.2 | 379.2 | 379.2 |
| Db (mm) | 368.2 | 368.2 | 368.2 |
| Dc (mm) | 376.2 | 376.2 | 376.2 |
| Resistive force to bead unseating (kgf) | 865 | 950 | 1005 |
| Mounting and dismounting property | Superior | Superior | Superior |

|  | Ref. 1 | Ref. 2 |
| --- | --- | --- |
| TIRE (Size 215/65VR15) | | |
| Toe | Presence | Absence |
| Distance between Toe tip and Bead base line (mm) | −2.5 | 0 |
| Hump groove | Presence | Absence |
| Distance L (mm) | 0 | |
| W1 (mm) | 1.2 | 1.0 |
| W2 (mm) | 2.0 | 0.9 |
| W2/W1 | 1.67 | 0.9 |
| RIM (Size 6.5X15) | | |
| D (mm) | 380.2 | 380.2 |
| Da (mm) | 379.2 | |
| Db (mm) | 368.2 | |
| Dc (mm) | 376.2 | |
| Resistive force to bead unseating (kgf) | 1100 | 355 |
| Mounting and dismounting property | Inferior | Superior |

Figure 4:
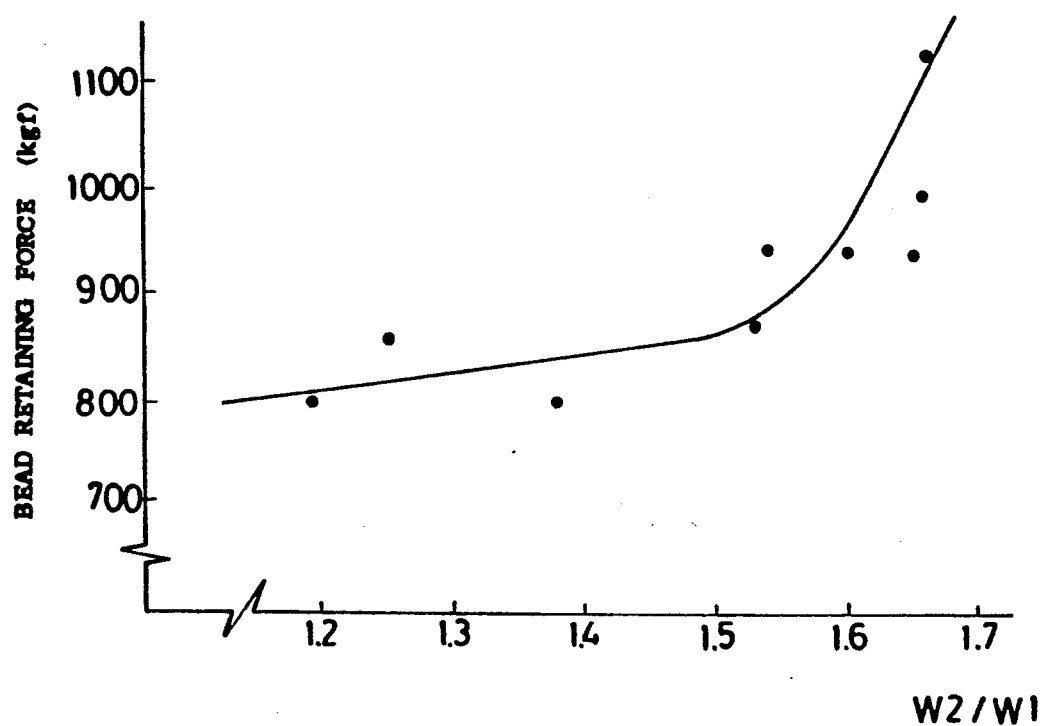
FIG. 4 is a graph showing the relationship between the resistance to bead unseating and the ratio W2/W1.

Moreover, FIG. 4 shows the relationship between the W2/W1 ratio and the bead retaining force, wherein the W2/W1 ratio was varied while keeping the total length W1+W2 constant, and the other specifications were the same as Example 2. This figure shows that the bead retaining force, that is, the resistance to bead dislocation from the rim increases sharply around 1.5 of the ratio W2/W1.

In the tire and rim assembly according to the present invention, even if the tire is subject to lateral force when making a sharp turn at high speed under such a condition that the internal pressure is suddenly lowered, the bead is prevented from being dislocated from the wheel rim, thereby enabling a safe stop. In addition, the assembly can be produced by the existing method, and the mounting and demounting operation is as easy as conventional standard assemblies.

The tire of the present invention can be mounted on a conventional standard rim aside from being used in the above assembly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. The tire comprising a pair of beads, a pair of sidewalls, a tread, a pair of bead cores disposed one in each bead, a carcass having at least one ply of cords arranged radially passing through the sidewalls and the tread and turned up around the bead cores to be secured thereto, a belt made of high modulus members disposed radially outside the carcass,
    at least one of the beads having an axially inwardly projecting bead toe disposed axially inside the bead base, and a circumferentially extending hump groove disposed between the toe and the bead base, wherein the tip of the toe is located radially outside a bead base line.

2. For use with a wheel rim having a pair of rim bases, a rim flange disposed axially outward of each rim base, a hump formed axially inside each rim base and an annular groove formed axially inside each hump,
    a tire comprising
    a pair of beads having a bead base seated on the rim base and defining a bead base line,
    a pair of bead cores disposed one in each bead,
    a carcass having at least one ply of cords arranged radially and turned up around the bead cores to be secured thereto, and
    a belt made of high modulus cords disposed radially outside the carcass,
    at least one of said beads having an axially inwardly projecting toe disposed axially inside the bead base and a circumferentially extending hump groove disposed between the toe and the bead base,
    the tip of said toe located radially outside the bead base line, whereby when the tire is mounted on the wheel rim and inflated to a regular internal pressure, said hump groove is spaced apart from the hump, and the tip of the toe is spaced apart from the annular groove, and the radial distance L between the radially outermost point RT of the hump and the radially outermost point PT of the hump groove is in a range from 0.5 mm to 2.0 mm.

3. The tire according to claim 1 or 2, wherein the ratio W2/W1 is greater than 1.5, wherein said ratio W2/W1 is the distance W2 from a point X2 on an axially inner surface of the bead to the center of gravity G of the bead core to the distance W1 from a point X1 on an axially outer surface of the bead to the center of gravity G of the bead core, where the points X1 and X2 are defined as intersections of line X passing through the center of gravity G of the bead core in parallel with the bead base line BL with the axially outer surface and the axially inner surface of the bead, respectively.

4. The tire according to claim 1 or 2, wherein said toe is made of hard rubber having a JIS-A hardness of 70 to 95.

5. The tire according to claim 1 or 2, wherein said at least one of the beads is provided along the contour thereof with a fiber layer for reinforcing the toe.

6. The tire according to claim 1 or 2, wherein each of said beads is provided with a fiber layer disposed between the carcass and the bead core so as to wrap the bead core and a bead apex strip therein.

* * * * *